United States Patent
Jaradi et al.

(10) Patent No.: US 11,364,872 B1
(45) Date of Patent: Jun. 21, 2022

(54) VEHICLE AIRBAG SUPPORTED BY A POST MOVABLE ALONG ROOF AND FLOOR TRACKS

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/177,638

(22) Filed: Feb. 17, 2021

(51) Int. Cl.
*B60R 21/232* (2011.01)
*B60R 21/2338* (2011.01)
*B60R 21/01* (2006.01)
*A61G 3/08* (2006.01)

(52) U.S. Cl.
CPC .......... *B60R 21/232* (2013.01); *A61G 3/0808* (2013.01); *B60R 21/01* (2013.01); *B60R 21/2338* (2013.01); *B60R 2021/01286* (2013.01)

(58) Field of Classification Search
CPC  B60R 2021/01286; B60R 2021/23161; B60R 2021/23386; B60R 2021/23388; B60R 21/01; B60R 21/214; B60R 21/232; B60R 21/2338; A61G 3/0808
See application file for complete search history.

(56) References Cited

U.S. PATENT DOCUMENTS

| | | | | |
|---|---|---|---|---|
| 9,511,734 B2 * | 12/2016 | Weerappuli | ............ | B60R 21/08 |
| 9,725,064 B1 * | 8/2017 | Faruque | ................ | B60N 2/143 |
| 9,789,840 B2 * | 10/2017 | Farooq | ................ | B60R 21/231 |
| 9,902,362 B2 * | 2/2018 | Farooq | ..................... | B60N 2/14 |
| 9,956,898 B1 * | 5/2018 | Dellock | ................ | B60R 13/02 |
| 9,994,182 B1 | 6/2018 | Jaradi et al. | | |
| 10,023,145 B1 * | 7/2018 | Rivera | ............... | B60R 21/2334 |
| 10,065,592 B2 * | 9/2018 | Jaradi | ................... | B60R 21/214 |
| 10,130,529 B2 * | 11/2018 | Gale | ..................... | A61G 3/0808 |
| 10,279,770 B2 * | 5/2019 | Faruque | .............. | B60R 21/2342 |
| 10,285,880 B1 * | 5/2019 | Ghannam | ............ | B60P 7/0892 |
| 10,343,642 B2 * | 7/2019 | Faruque | ............... | B60R 21/214 |
| 10,717,358 B2 * | 7/2020 | Patil | ....................... | B60K 37/00 |
| 10,807,556 B2 * | 10/2020 | Hill | ........................ | B60R 21/26 |
| 11,083,650 B2 * | 8/2021 | Salter | ..................... | A61G 3/061 |
| 11,135,992 B2 * | 10/2021 | Faruque | .............. | B60R 21/214 |
| 11,186,246 B2 * | 11/2021 | Min | ....................... | B60R 21/232 |
| 2020/0017058 A1 | 1/2020 | Jaradi et al. | | |
| 2021/0394702 A1 * | 12/2021 | Farooq | ................. | B60R 21/213 |

FOREIGN PATENT DOCUMENTS

| | | |
|---|---|---|
| JP | 6747327 B2 | 8/2020 |
| KR | 20170031406 A | 3/2017 |

* cited by examiner

Primary Examiner — Laura Freedman
(74) Attorney, Agent, or Firm — Frank A. MacKenzie; Bejin Bieneman PLC

(57) ABSTRACT

A vehicle includes a floor. The vehicle includes a first track elongated along a vehicle-longitudinal axis and fixed to the floor. The vehicle includes a roof above the floor. The vehicle includes a second track elongated along the vehicle-longitudinal axis and fixed to the roof. The vehicle includes a post supported by and movable along the first track and the second track. The vehicle includes an airbag supported by the post and inflatable from an uninflated position to an inflated position.

18 Claims, 5 Drawing Sheets

US 11,364,872 B1

VEHICLE AIRBAG SUPPORTED BY A POST MOVABLE ALONG ROOF AND FLOOR TRACKS

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
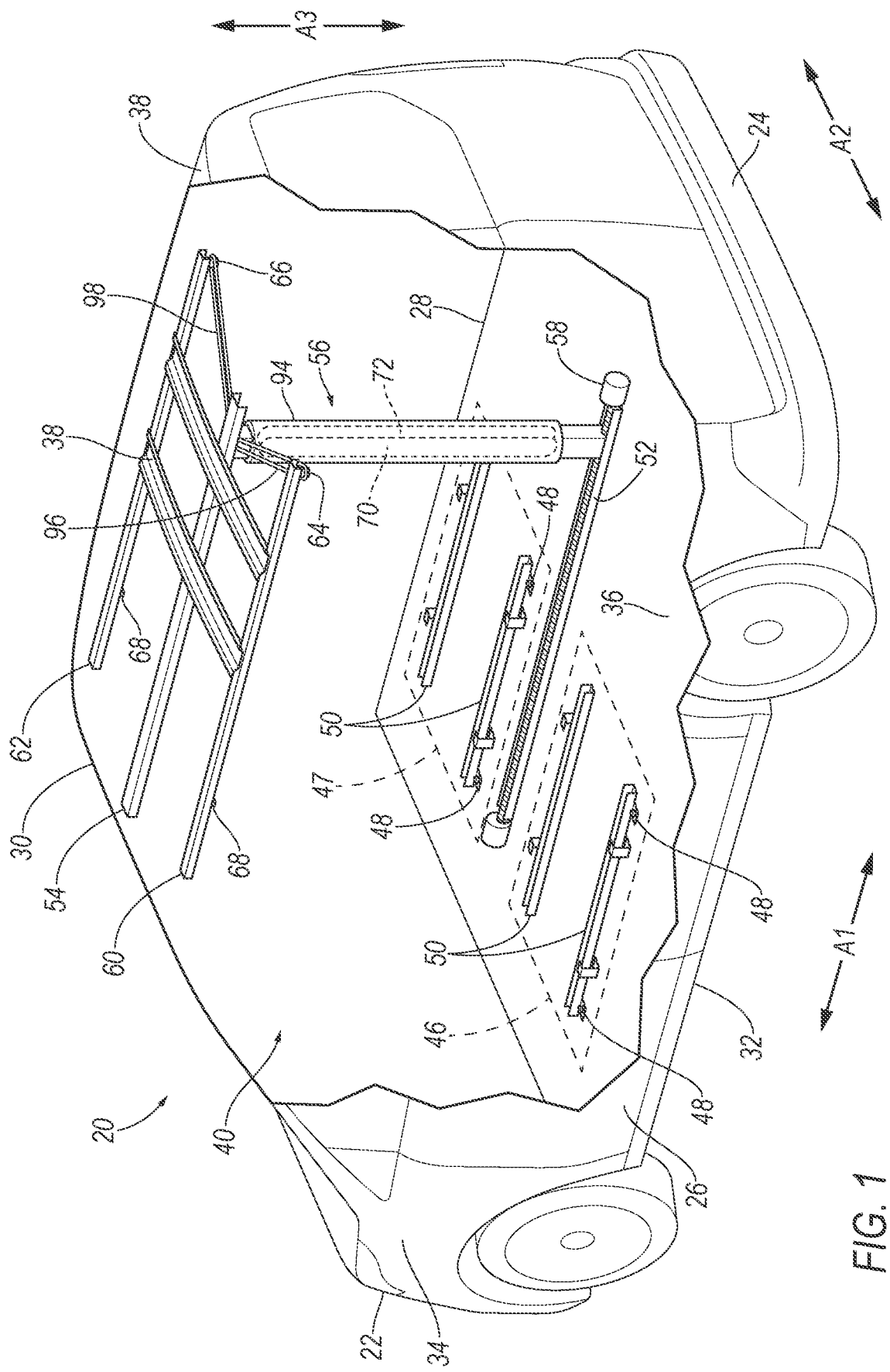
FIG. 1 is a perspective view a vehicle having a post supporting a pair of airbags in uninflated positions with the post in a stowed position.

A vehicle includes a floor. The vehicle includes a first track elongated along a vehicle-longitudinal axis and fixed to the floor. The vehicle includes a roof above the floor. The vehicle includes a second track elongated along the vehicle-longitudinal axis and fixed to the roof. The vehicle includes a post supported by and movable along the first track and the second track. The vehicle includes an airbag supported by the post and inflatable from an uninflated position to an inflated position.

The floor may define a first seating area and a second seating area, the first track and the second track between the first seating area and the second seating area along a cross-vehicle axis.

The vehicle may include a second airbag supported by the post and inflatable to an inflated position, the airbag and the second airbag in the inflated positions extending away from the post along the cross-vehicle axis.

The vehicle may include a first floor mount supported by the floor within the first seating area and a second floor mount supported by the floor within the second seating area.

The vehicle may include a computer including a processor and a memory storing instructions executable by the processor to move the post along the first track and the second track upon detecting a personal mobility device is secured to the first floor mount or the second floor mount.

The airbag and the second airbag in the inflated positions may be forward of the first seating area and the second seating area.

The vehicle may include an actuator operatively coupled to the post to move the post along the first track and the second track.

The vehicle may include a third track elongated along the vehicle-longitudinal axis and fixed to the roof, and a tether extending from the post to the third track.

The airbag in the inflated position may extend from the post beyond the third track along a cross-vehicle axis.

The vehicle may include a second post supported by and movable along the third track, the tether extending from the post to the second post.

The tether may be fixed to the airbag and extends from the post around the second post to the airbag when the airbag is in the uninflated position.

The tether may extend from the post beyond the second post when the airbag is in the inflated position.

The airbag is in the inflated position may extend to a distal end and the tether is fixed to the distal end.

The vehicle may include a tether retractor fixed to the post and operatively engaged with the tether.

The tether retractor may include pyrotechnic material.

The vehicle may include a covering surrounding the post and the airbag in the uninflated position.

The airbag in the inflated position may include a main portion having an impact panel that extends along a cross-vehicle axis and an extension portion that extends rearward from the impact panel.

The vehicle may include a tether fixed to the extension portion and the post.

With reference to the figures, wherein like numerals indicate like parts throughout the several views, a vehicle 20 includes a floor 36. The vehicle 20 includes a first track 52 elongated along a longitudinal axis A1 and fixed to the floor 36. The vehicle 20 includes a roof 38 above the floor 36. The vehicle 20 includes a second track 54 elongated along the longitudinal axis A1 and fixed to the roof 38. The vehicle 20 includes a post 56 supported by and movable along the first track 52 and the second track 54. The vehicle 20 includes an airbag 70, 72 supported by the post 56 and inflatable from an uninflated position to an inflated position. Since the post 56 is movable along the first track 52 and the second track 54, the post 56 may be selectively positioned relative to a seating area 46 of the vehicle 20. For example, the post 56 may be moved along the first track 52 and the second track 54 from a stowed position to a deployed position at which the airbag 70, 72 in the inflated position may control kinematics of an occupant seated in the seating area 46.

The vehicle 20 may be any suitable type of ground vehicle, e.g., a passenger or commercial automobile such as a sedan, a coupe, a truck, a sport utility, a crossover, a van, a minivan, a taxi, a bus, etc.

In the present description, relative vehicular orientations and directions (by way of example, top 30, bottom 32, front 22, rear 24, outboard, inboard, inward, outward, lateral, left, right, etc.) is from the perspective of an occupant in the vehicle 20 facing a forward direction, e.g., toward a forward instrument panel and/or forward windshield of the vehicle 20. The forward direction of the vehicle 20 is the direction of movement of the vehicle 20 when the vehicle 20 is engaged in forward drive with wheels of the vehicle straight.

The vehicle 20 defines the longitudinal axis A1 extending between a front 22 and a rear 24 of the vehicle 20. The vehicle 20 defines a cross-vehicle axis A2 extending between a left side 26 and a right side 28 of the vehicle 20. The vehicle 20 defines a vertical axis A3 extending between a top 30 and a bottom 32 of the vehicle 20. The longitudinal axis A1, the cross-vehicle axis A2, and the vertical axis A3 are perpendicular relative to each other.

The vehicle 20 includes a body 34. The body 34 includes body panels partially defining an exterior of the vehicle 20. The body panels may present a class-A surface, e.g., a finished surface exposed to view by a customer and free of unaesthetic blemishes and defects. The body 34 includes, e.g., the floor 36, the roof 38, one or more pillars, etc. The roof 38 may extend along the longitudinal axis A1 and the cross-vehicle axis A2. The roof 38 is above and spaced from the floor 36 along the vertical axis A3. The roof 38 may include, e.g., crossbeams, a headliner, etc.

The body 34 may define a passenger compartment 40 to house occupants, if any, of the vehicle 20. The passenger compartment 40 may extend across the vehicle 20, i.e., from the right side 28 to the left side 26 of the vehicle 20. The passenger compartment 40 includes a front end and a rear end with the front end being in front of the rear end during forward movement of the vehicle 20. The passenger compartment 40 is between the roof 38 and the floor 36 along the vertical axis A3.

The floor 36 of the vehicle 20 supports objects, such as seats 42, occupants, the personal mobility device 44, etc., within the passenger compartment 40. The floor 36 may extend from the front end to the rear end of the passenger compartment 40 and from the right side 28 to the left side 26 of the vehicle 20. The floor 36 may define one or more seating areas, e.g., a first seating area 46 and a second seating area 47. The first seating area 46 and the second seating area 47 may be arranged, e.g., along the cross-vehicle axis A2. The seating areas 46, 47 designate positions in the passenger compartment 40 for the occupant to occupy, e.g., occupant on a seat 42 in the seating area 46, 47, an occupant on a personal mobility device 44 in the seating area 46, 47, etc. For example, seating areas 46, 47 may be defined by anchors 48 of the floor 36. The anchors 48 may include fasters, reinforcement plates, etc. The anchors 48 may be connected to a seat 42 and/or a floor mount 50 supported by the floor 36 within each of the seating areas 46, 47. The seating areas 46, 47 may surround the anchors 48, e.g., with the first seating area 46 surrounding some of the anchors 48 and the second seating area 47 surrounding other of the anchors 48.

Figure 3:
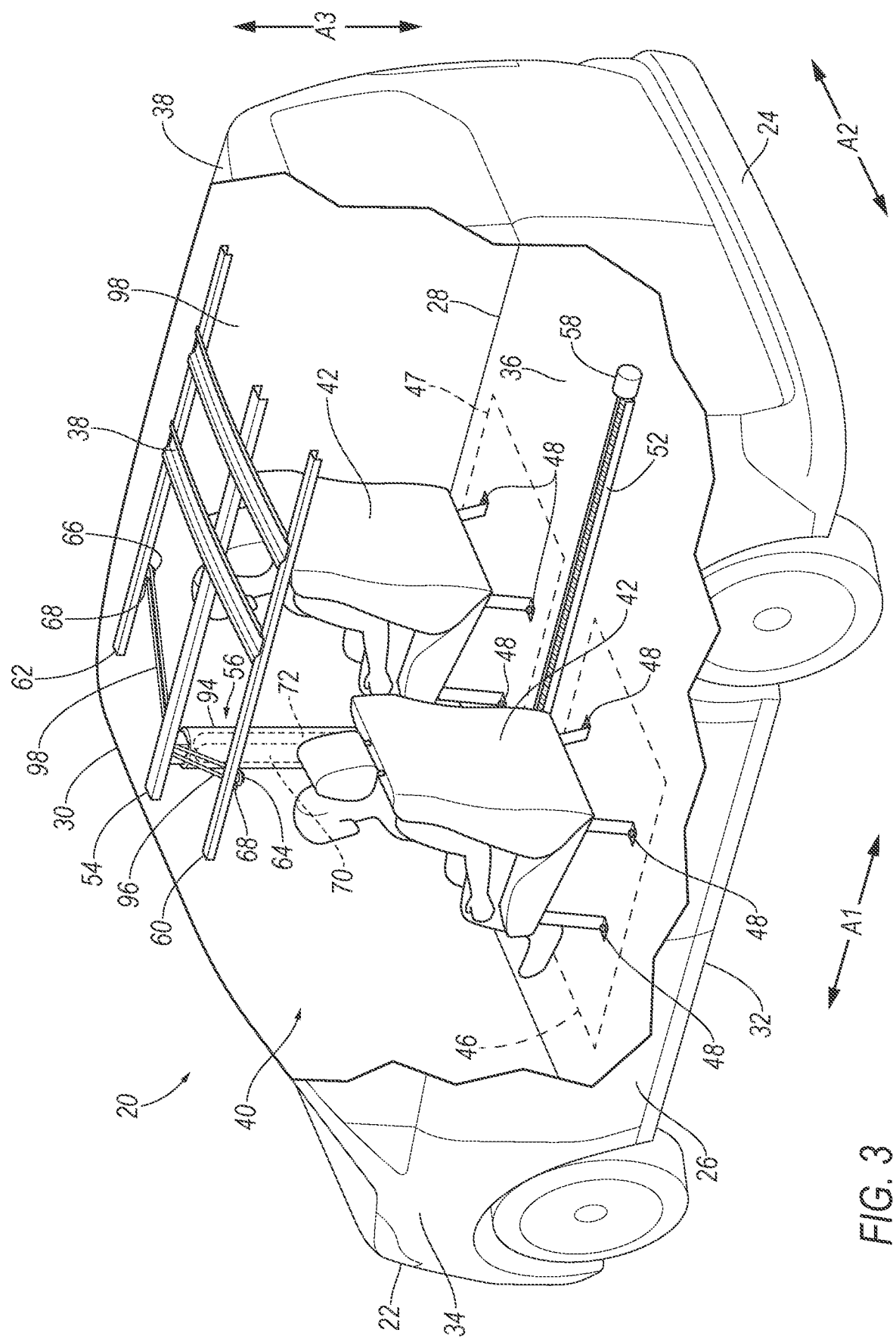
FIG. 3 is a perspective view the vehicle with the post in the deployed position and between vehicle seats.

The seats 42, shown in FIG. 3, each include a seatback and a seat bottom. The seatback may be supported by the seat bottom and may be stationary or movable relative to the seat bottom. The seatback and the seat bottom may be adjustable in multiple degrees of freedom. Specifically, the seatback and the seat bottom may themselves be adjustable, in other words, adjustable components within the seatback and/or the seat bottom, and/or may be adjustable relative to each other. The seat 42 may be removable and/or foldable, e.g., to provide space for the personal mobility device 44.

Figure 2:
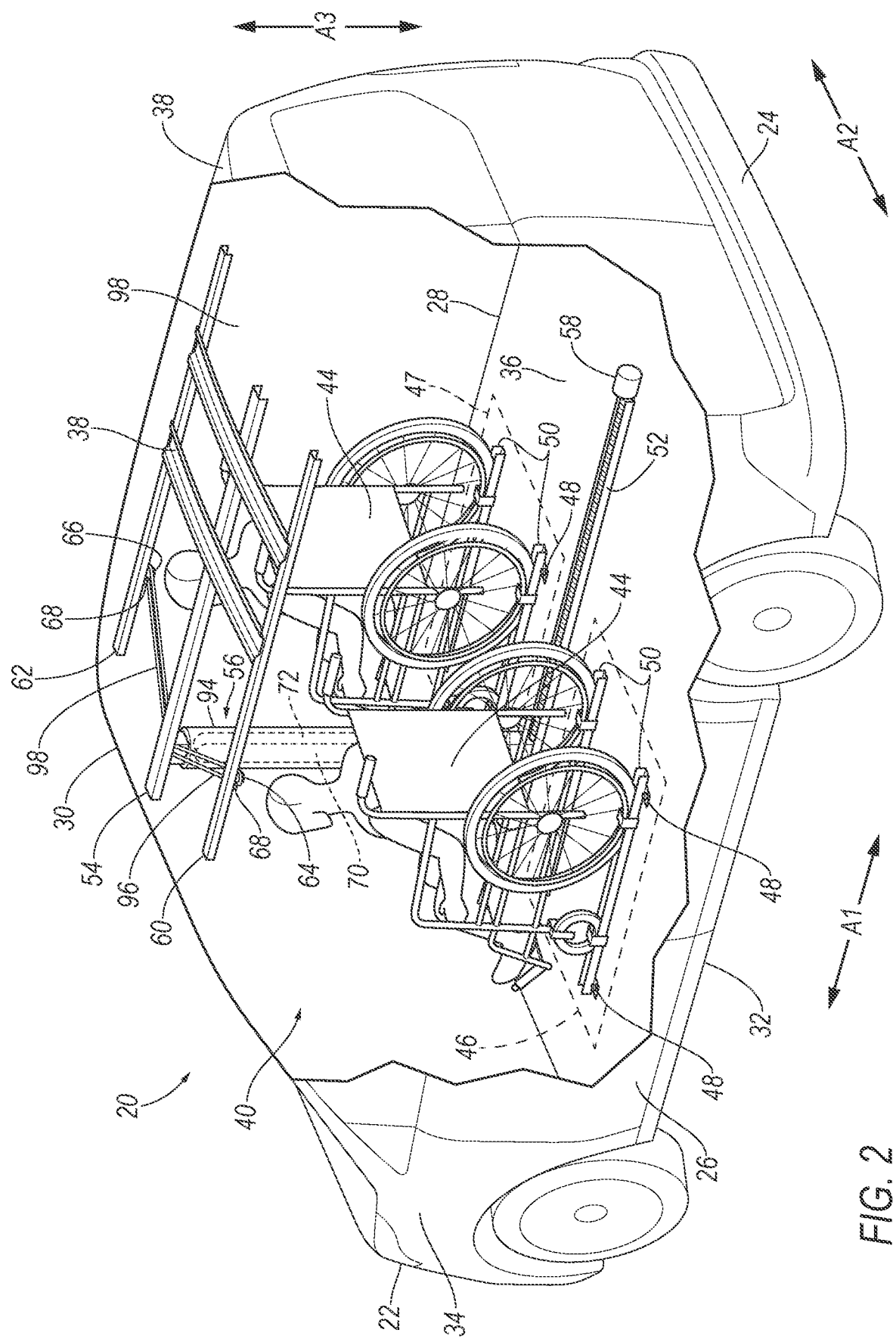
FIG. 2 is a perspective view the vehicle with the post in a deployed position and between personal mobility devices.
Figure 4:
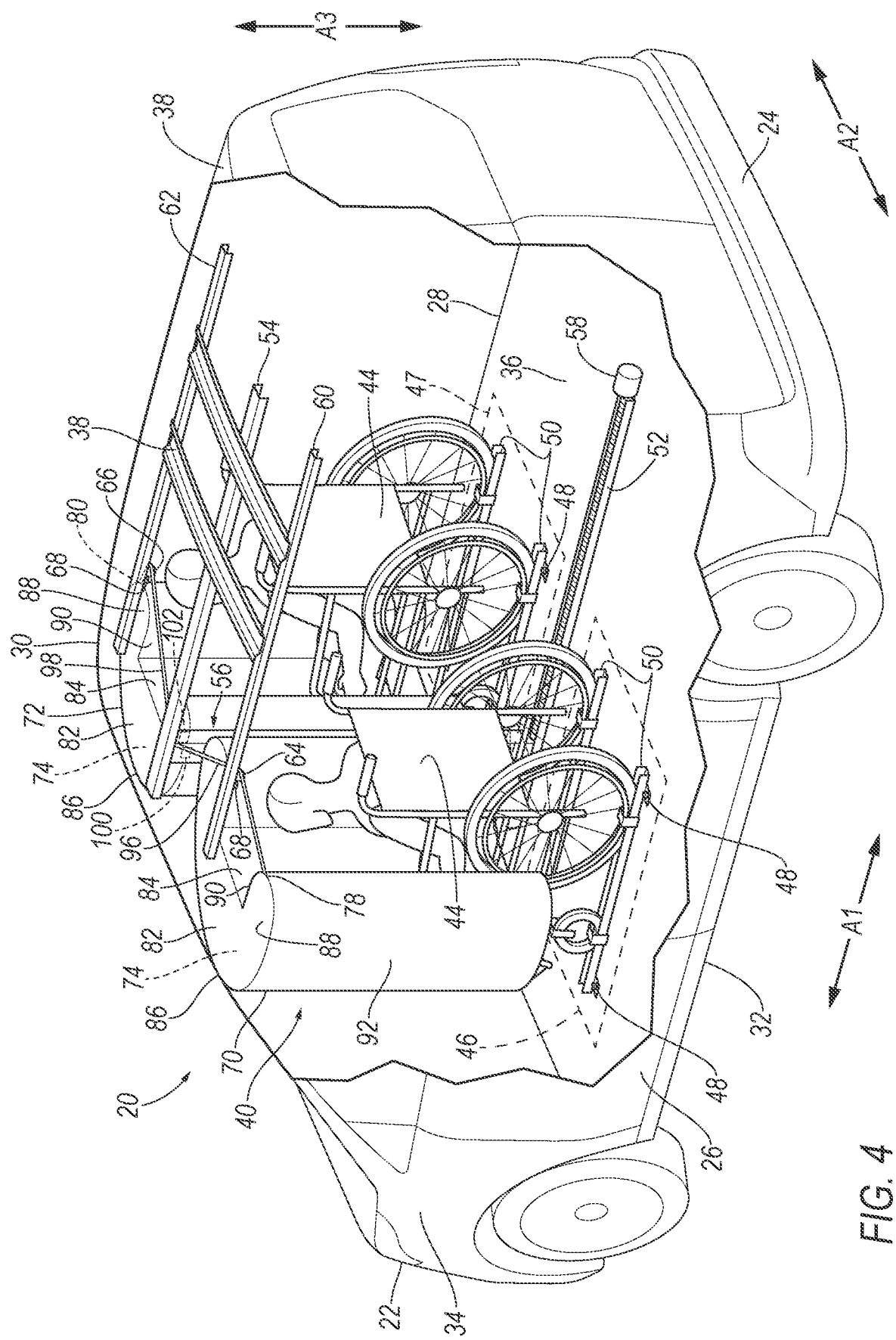
FIG. 4 is a perspective view the vehicle with the post in the deployed position.

Each of the floor mounts 50, shown in FIGS. 1, 2, and 4, may secure a personal mobility device 44 within the passenger compartment 40 at the respective seating area 46, 47. The floor mount 50 may include channels designed to engage wheels of the personal mobility device 44. Specifically, the channels are sized and shaped to receive wheels of the personal mobility device 44 such to resist lateral movement of the personal mobility device 44 (i.e., along the cross-vehicle axis A2) during operation of the vehicle 20. The channels may be spaced from each other along the cross-vehicle axis A2 and parallel to each other along the longitudinal axis A1. The channels may be fixed to the floor 36 via the anchors 48. Each of the floor mounts 50 may include suitable number of latches, tethers, etc., to secure the wheels or other structure of the personal mobility device 44 to the vehicle 20 and limit relative movement therebetween. The latches may limit the movement of the personal mobility device 44 in the channels, e.g., via engagement with the wheels. The latches may be electronic or manual, e.g., each latch may include a solenoid. Actuation of the solenoid may engage the latch with the wheel.

The personal mobility device 44 may be of any suitable type that supports a seated occupant and provides mobility to the seated occupant, i.e., the personal mobility device 44 transports the seated occupant outside of the vehicle 20 and moves the seated occupant in the passenger compartment 40 during ingress to and egress from the vehicle 20. The personal mobility device 44 supports the seated occupant in the passenger compartment 40 during operation of the vehicle 20. The personal mobility device 44 may include wheels, as described above. As examples including wheels, the personal mobility device 44 may be a wheelchair or a scooter. As another example, the personal mobility device 44 may include a continuous track. In such an example, the continuous track is in contact with ground and personal mobility device 44 may include wheels that transmit force to the continuous track. The personal mobility device 44 may include a motor operably connected to the wheels and a battery that provides power to the motor. The personal mobility device 44 may be for example, a wheelchair, an electric scooter, etc.

The first track 52 and the second track 54 support and enable movement of the post 56 along the longitudinal axis A1. The first track 52 and the second track 54 are elongated along the longitudinal axis A1, i.e., the first track 52 and the second track 54 are longer along the longitudinal axis A1 than along the cross-vehicle axis A2 or the vertical axis A3. The first track 52 and the second track 54 may include rails, channels, grooves, lips, etc., that are elongated along the longitudinal axis A1. The rails, channels, grooves, lips, etc., may permit movement, e.g., of the post 56, along the longitudinal axis A1 and inhibit movement along the cross-vehicle axis A2. The first track 52 is fixed to the floor 36, e.g., via fastener, weld, etc. The second track 54 is fixed to the roof 38, e.g., to the crossbars of the roof 38 via fastener weld, etc. The first track 52 and the second track 54 may be between the first seating area 46 and the second seating area 47 along the cross-vehicle axis A2, e.g., with the first seating area 46 to the left of the first track 52 and the second track 54, and the second seating area 47 to the right of the first track 52 and the second track 54.

The post 56 is supported by and movable along the first track 52 and the second track 54. For example. the post 56 may be engaged with the rails, channels, grooves, lips, etc., of the first track 52 and the second track 54 such that the post 56 may slide or otherwise move along the longitudinal axis A1 and may be inhibited from moving along the cross-vehicle axis A2 and vertical axis A3. The post 56 is elongated along the vertical axis A3 from the first track 52 to the second track 54.

The vehicle 20 may include an actuator 58 operatively coupled to the post 56 to move the post 56 along the first track 52 and the second track 54, e.g., in response to a command from a computer 108.

The actuator 58 may be fixed to the floor 36. The actuator 58 may be fixed to the roof 38, e.g., to the crossbar via fasteners or the like. The actuator 58 may include a motor, reduction gear, a worm gear, a rack and pinion, and/or any other electromechanical and/or hydraulic structure suitable from moving the post 56 along the first track 52 and the second track 54. For example, the motor may be fixed to the first track 52, the second track 54, the roof 38, or the floor 36. The worm gear may be operatively engaged with post 56. Rotation of the worm gear by the motor may move post 56 along the first track 52 and the second track 54. As another example, the actuator 58 may be a linear actuator that actuates to change a length between ends of the actuator 58, e.g., a linear servo, a screw type including a threaded shaft and hole, a hydraulic type including a piston and cylinder, a rack and pinion type, etc. Such actuator may have one end fixed to the post 56 and an opposite end fixed to the first track 52, the second track 54, the roof 38, or the floor 36. Although only one actuator 58 is illustrated, the vehicle 20 may include additional actuators 58, e.g., with the actuator 58 fixed to the roof 38 and another actuator 58 fixed to the floor 36.

The vehicle 20 may include a third track 60 and/or a fourth track 62 elongated along the longitudinal axis A1. The third track 60 and the fourth track 62 may include rails, channels, grooves, lips, etc., that are elongated along the longitudinal axis A1. The rails, channels, grooves, lips, etc., may permit movement, e.g., of a second post 64 and/or a third post 66, along the longitudinal axis A1 and inhibit movement along the cross-vehicle axis A2. The third track 60 and the fourth track 62 may be fixed to the roof 38 at opposite sides of the first track 52. For example, the third track 60 may be to the left of the first track 52, and the fourth track 62 may be to the right of the first track 52.

The second post 64 and the third post 66 may be supported by and movable along the third track 60 and the fourth track 62, respectively. The second post 64 and the third post 66 may be freely movable along the third track 60 and the fourth track 62, e.g., rollers or the like may be fixed to the second post 64 and the third post 66, the roller may engage the rails, channels, grooves, lips, etc., of the third track 60 and the fourth track 62. Additionally or alternatively, actuators (not shown) may move the second post 64 and the third post 66 along the third track 60 and the fourth track 62, e.g., in response to a command from the computer 108.

The vehicle 20 may include one or more stops 68 that limit movement of the second post 64 and/or the third post 66 along the third track 60 and/or the fourth track 62. For example, the stops 68 may be positioned to block movement of the second post 64 and the third post 66 along the rails, channels, grooves, lips, etc., of the third track 60 and the fourth track 62. The stops 68 may be rubber, metal, or any suitable material. The stops 68 may be fixed to the third track 60, the fourth track 62, the roof 38, etc., e.g., with a fastener of the like.

One or more airbags 70, 72, e.g., a first airbag 70 and a second airbag 72, are supported by the post 56. The first airbag 70 and the second airbag 72 are inflatable from uninflated positions, shown in FIGS. 1-3, to inflated positions, shown in FIG. 4. For example, the first airbag 70 and the second airbag 72 may each define an inflation chamber 74 that receives inflation medium, e.g., from an inflator 76, to inflate the airbags 70, 72 from the uninflated positions to the inflated positions. One or more sheets of woven material may be sewn, or otherwise fixed, to enclose the inflation chamber 74 and provide shape to the first airbag 70 and the second airbag 72 in the inflated positions. The airbags 70, 72 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

One or more inflators 76 may be in fluid communication with the inflation chambers 74 of the first airbag 70 and the second airbag 72. For example, one inflator 76 may be in fluid communication with the inflation chamber 74 of the first airbag 70 and another inflator 76 may be in fluid communication with the inflation chamber 74 of the second airbag 72. Alternately, a single inflator 76 may be in fluid communication with the inflation chambers 74 of both the first airbag 70 and the second airbag 72. Each inflator 76 may be, for example, at least partially in the inflation chamber 74 to deliver inflation medium directly to the inflation chamber 74 or may be connected to the inflation chamber 74 through fill tubes, diffusers, etc. The inflator 76 inflates the first airbag 70 and/or the second airbag 72 with inflation medium, such as a gas, to move the first airbag 70 and/or the second airbag 72 from the uninflated position to the inflated position. The inflator 76 may be supported by the post 56, or any suitable component. For example, the inflator 76 may be fixed to the post 56 via a fastener or the like. The inflator 76 may be, for example, a pyrotechnic inflator that uses a chemical reaction to drive inflation medium to the first airbag 70 and the second airbag 72. The inflator 76 may be of any suitable type, for example, a cold-gas inflator 76.

The vehicle 20 may include one or more airbag housings supporting the first airbag 70 and the second airbag 72, e.g., one airbag housing may support the first airbag 70 and another airbag housing may support the second housing. Alternately, a single airbag housing may support both the first airbag 70 and the second airbag 72. The airbag housing (s) may house the first airbag 70 and the second airbag 72 in the uninflated positions and supports the first airbag 70 and the second airbag 72 in the inflated positions. The first airbag 70 and the second airbag 72 may be rolled and/or folded in the uninflated position to fit within the airbag housing(s). The inflator 76 may be supported by, e.g., fixed to, the airbag housing. The airbag housing(s) may be of any suitable material, e.g., a rigid polymer, a metal, a composite, or a combination of rigid materials. The airbag housing(s) may be fixed to the post 56, e.g., via fastener or the like.

With reference to FIG. 4, the first airbag 70 and the second airbag 72 in the inflated positions extend outwardly away from the post 56 along the cross-vehicle axis A2. For example, the first airbag 70 in the inflated position may extend from the post 56 toward the left side 26 of the vehicle 20 to a first distal end 78 and the second airbag 72 in the inflated position may extend from the post 56 toward the right side 28 of the vehicle 20 to a second distal end 80. The first airbag 70 in the inflated position may extend from the post 56 beyond the third track 60, e.g., the third track 60 may be between the post 56 and the first distal end 78 along the cross-vehicle axis A2. The second airbag 72 in the inflated position may extend from the post 56 beyond the fourth track 62, e.g., the fourth track 62 may be between the post 56 and the second distal end 80 along the cross-vehicle axis A2.

The first airbag 70 and the second airbag 72 in the inflated positions may each include a main portion 82. The main portions 82 may extend outward from the post 56 toward the left side 26 and the right side 28. Each main portion 82 includes an impact panel 84 that extends along the cross-vehicle axis A2, e.g., to control kinematics of an occupant seated behind such impact panel 84 during an impact to the vehicle 20. Each main portion 82 may include a front panel 86 forward of the impact panel 84, e.g., with the inflation chamber 74 therebetween.

The first airbag 70 and the second airbag 72 in the inflated positions may each include an extension portion 88. The extension portion 88 may include an inner panel 90 and an outer panel 92, e.g., with the inflation chamber 74 therebetween. The extension portion 88 extends rearward from the impact panel 84. For example, the extension portions 88 may extend from the impact panel 84 toward the rear 24 of the vehicle 20 along the longitudinal axis A1. The extension portion 88 may abut the body 34 of vehicle 20. For example, the extension portion 88 of the first airbag 70 may abut a door on the left side 26 of the body 34, and the extension portion 88 of the second airbag 72 may abut a door on the right side 28 of the body 34.

The vehicle 20 may include a covering 94 surrounding the post 56, the airbags 70, 72 in the uninflated positions, and the airbag housing(s). The covering 94 provides a class-A outer surface to the post 56, etc. The covering 94 may include upholstery and padding. The upholstery may be cloth, leather, faux leather, or any other suitable material. The upholstery may be stitched in panels around the post 56, etc. The covering 94 may include a tear seam or the like for separation upon inflation of the first airbag 70 and/or the second airbag 72. The tear seam may be elongated along the vertical axis A3.

The vehicle 20 may include one or more tethers, e.g., a first tether 96 and a second tether 98, for controlling kinematics of the first airbag 70 and the second airbag 72 in the inflated positions. The first tether 96 and the second tether 98 may extend from the post 56 to the third track 60 and fourth track 62 respectively, e.g., to the second post 64 supported by the third track 60 and the third post 66 supported by the fourth track 62. The first tether 96 may, for example, extend around the second post 64 and extend back to the post 56 when the first airbag 70 is in the inflated position. The first tether 96 may extend from the post 56 and beyond the second post 64 when the first airbag 70 is in the inflated position. The second tether 98 may likewise extend around or beyond the third post 66, e.g., depending on whether the second airbag 72 is at the inflated position or the uninflated position. One end of the first tether 96 and the second tether 98 may be fixed to the post 56 and an opposite end of the first tether 96 and the second tether 98 may be fixed to the first airbag 70 and the second airbag 72, respectively, e.g., to the extension portions 88 at the distal ends 78, 80.

The vehicle 20 may include one or more tether retractors, e.g., a first tether retractor 100 and a second tether retractor 102 that generate tension in the first tether 96 and the second tether 98, respectively. The first tether retractor 100 and the second tether retractor 102 may generate such tension in response to receiving a command from the computer 108. The first tether retractor 100 and the second tether retractor 102 may be supported by, e.g., fixed to, the post 56. The first tether retractor 100 and the second tether retractor 102 may be operatively engaged with the first tether 96 and the second tether 98 and apply force thereto. For example, the first tether retractor 100 and second tether retractor 102 may each include a piston and cylinder arrangement with pyrotechnic material in the cylinders. Activation of the pyrotechnic material, e.g., by the computer 108, my urge the piston along the respective cylinder. The pistons may be coupled to the first tether 96 and the second tether 98. Movement of the pistons may apply force to the first tether 96 and the second tether 98. As another example, the first tether retractor 100 and second tether retractor 102 may each include a spool around which the first tether 96 and the second tether 98 are wound. Rotation of the spool may apply force to the first tether 96 and the second tether 98. The first tether retractor 100 and the second tether retractor 102 can each include pyrotechnic material. The pyrotechnic may be combustible to produce gas. The pyrotechnic material may be formed of a solid mixture of substances that, when ignited, react to produce the gas. For example, the pyrotechnic material may be formed of sodium azide ($NaNO_3$), potassium nitrate ($KNO_3$), and silicon dioxide ($SiO_2$), which react to form nitrogen gas ($N_2$). Actuation of the pyrotechnic material, e.g., in response to an instruction from the computer 108, may generate gas and urge the piston within a cylinder, apply torque to the spool, etc.

The vehicle 20 may include one or more sensors 104 configured to detect a personal mobility device 44 in the seating area 46. For example, one or more object detection sensors may be supported by the vehicle 20 in the passage cabin and oriented toward the seating area 46 above the floor mount 50. As another example, pressure sensors may be supported by the floor 36 in the seating area 46 and indicate that a personal mobility device 44 is in the seating area 46 when weight above a threshold is detected. As another example, a switch, proximity sensors, etc., may be attached to the floor mount 50 in the seating area 46 and detect when a personal mobility device 44 is secured to the floor mount 50.

The vehicle 20 may include one or more impact sensors 106 configured to detect an impact to the vehicle 20. The impact sensors 106 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensors 106 may be located at numerous points in or on the vehicle 20.

Figure 5:
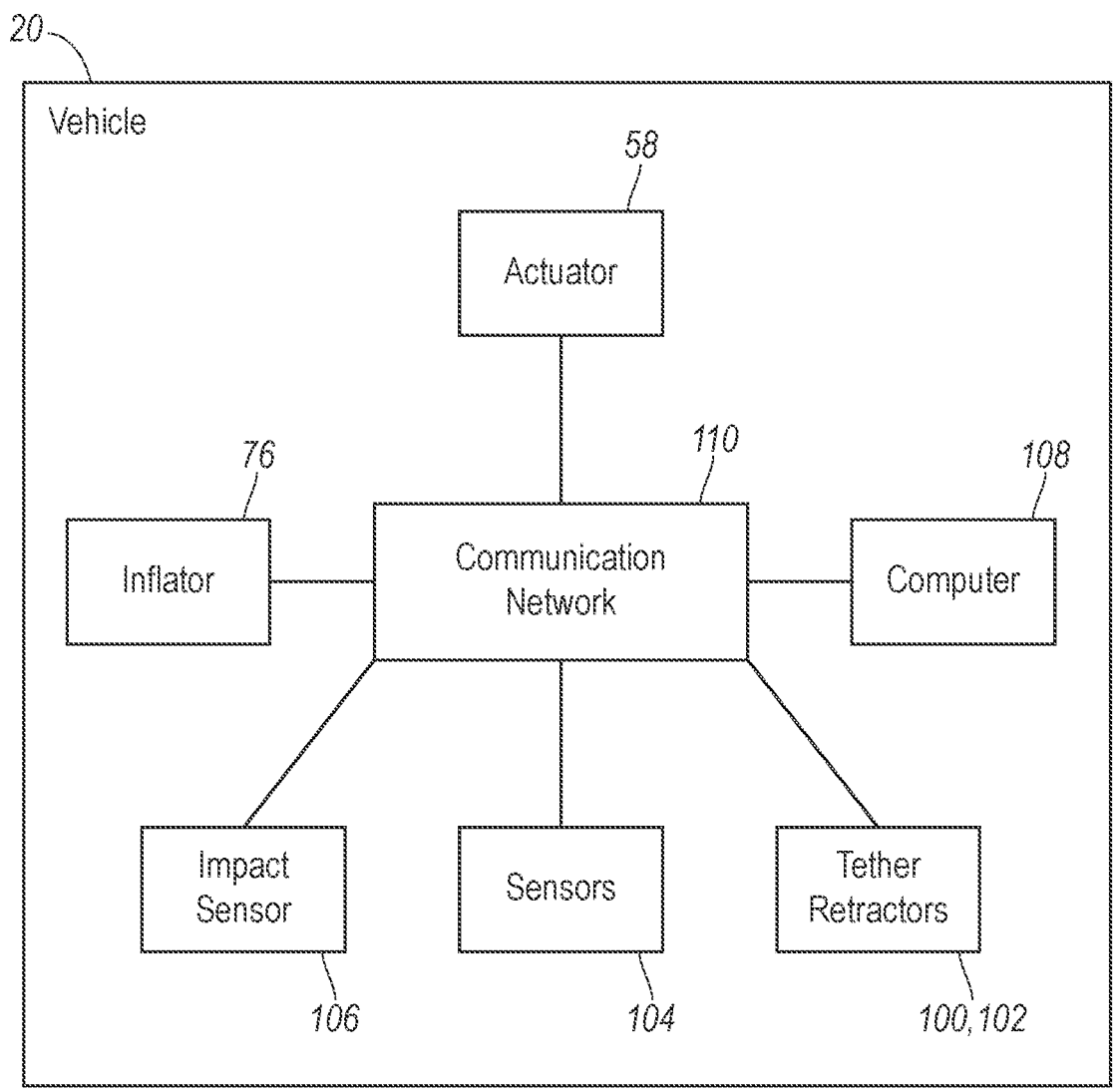
FIG. 5 is a bock diagram of components of the vehicle.

With reference to FIG. 5, the computer 108 is a microprocessor-based controller implemented via circuits, chips, or other electronic components. The computer 108 includes a processor and a memory such as are known. The memory includes one or more forms of computer 108 readable media, and stores instructions executable by the computer 108 for performing various operations, including as disclosed herein. The computer 108 may be programmed to execute operations disclosed herein. Specifically, the memory stores instructions executable by the processor to execute the operations disclosed herein and electronically stores data and/or databases. For example, the computer 108 may include one or more dedicated electronic circuit including an ASIC (Application Specific Integrated Circuit) that is manufactured for a particular operation. In another example, the computer 108 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging. The computer 108 may be a set of computer 108s communicating with one another.

The computer 108 is generally arranged for communications on a communication network 110 that can include a bus in the vehicle 20 such as a controller area network (CAN) or the like, and/or other wired and/or wireless mechanisms. Via the communication network 110, the computer 108 may transmit messages to various devices in the vehicle 20, and/or receive messages (e.g., CAN messages) from the various devices, e.g., the inflator 76, the actuator 58, the sensors 104, the impact sensors 106, etc. Alternatively or additionally, in cases where the computer 108 comprises a plurality of devices, the communication network 110 may be used for communications between devices represented as the computer 108 in this disclosure.

The computer 108 may be programmed to, i.e., the memory stores instructions executable by the processor to move the post 56 along the track. For example, computer 108 may command the actuator 58 to move the post 56 from a stowed position to a deployed position, and vice versa. The stowed position may be, e.g., at a position closest a rear end of the first track 52. The deployed position may be at a front 22 of the seating area 46. The deployed position may be relative to the seat 42 and/or the personal mobility device 44, e.g., a specified amount forward of a detected position the seat 42 and/or the personal mobility device 44 along the longitudinal axis A1.

The computer 108 may be programmed to move the post 56 along the track upon detecting a personal mobility device 44 is secured to the floor mount 50. The computer 108 may detect a personal mobility secured to the floor mount 50 based on data from the sensors 104 configured to detect a personal mobility device 44 in the seating area 46. The data may be received by the computer 108 from the sensors 104 via the communication network 110. The data from the sensors 104 may indicate, for example, that an object is detected in the seating area 46 above the floor 36 mount, that weight above a threshold amount is being applied to the seating area 46, that the floor 36 mount is engaged with a personal mobility device 44, etc. The computer 108 may, in response to receiving such data, send a command to the actuator 58 specifying movement of the post 56 to the deployed position. The computer 108 may transmit such command via the communication network 110.

The computer 108 may be programmed to inflate the first airbag 70 and the second airbag 72, and to retract the first tether 96 and the second tether 98. For example, under normal operating conditions of the vehicle 20, the first airbag 70 and the second airbag 72 are in the uninflated positions. In the event of an impact, the impact sensor 106 may detect the impact and transmit a signal through the communication network 110 to the computer 108. In response to receiving such signal, the computer 108 may transmit a signal through the communication network 110 to the inflator 76 to inflate the first airbag 70 and the second airbag 72. In response to receiving such signal, the inflator 76 may discharge and inflate the airbag to the inflated position to control kinematics of the seat 42 and/or the occupant. Also in response to receiving the signal from the impact sensor 106, the computer 108 may also command actuation of the first tether retractor 100 and the second tether retractor 102. The computer 108 may command the first tether retractor 100 and the second tether retractor 102 a specific amount of time after sending the signal to the inflator 76, e.g., 20 milliseconds. Upon receiving such command the pyrotechnic material of the first tether retractor 100 and the second tether retractor 102 may detonate and generate tension in the first tether 96 and the second tether 98. The tensioned first tether 96 and second tether 98 may provide support to the first airbag 70 and the second airbag 72 in the inflated positions and control kinematic of occupant of the vehicle 20 during the detected impact.

The adjectives "first," "second," etc., are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:
   a floor;
   a first track elongated along a vehicle-longitudinal axis and fixed to the floor;
   a roof above the floor;
   a second track elongated along the vehicle-longitudinal axis and fixed to the roof;
   a first post supported by and movable along the first track and the second track; and
   a first airbag supported by the first post and inflatable from an uninflated position to an inflated position.

2. The vehicle of claim 1, wherein the floor defines a first seating area and a second seating area, the first track and the second track between the first seating area and the second seating area along a cross-vehicle axis.

3. The vehicle of claim 2, further comprising a second airbag supported by the first post and inflatable to an inflated position, the first airbag and the second airbag in the inflated positions extending away from the first post along the cross-vehicle axis.

4. The vehicle of claim 3, further comprising a first floor mount supported by the floor within the first seating area and a second floor mount supported by the floor within the second seating area.

5. The vehicle of claim 4, further comprising a computer including a processor and a memory storing instructions executable by the processor to move the first post along the first track and the second track upon detecting a personal mobility device is secured to the first floor mount or the second floor mount.

6. The vehicle of claim 3, wherein the first airbag and the second airbag in the inflated positions are forward of the first seating area and the second seating area.

7. The vehicle of claim 1, further comprising an actuator operatively coupled to the first post to move the first post along the first track and the second track.

8. The vehicle of claim 1, further comprising a third track elongated along the vehicle-longitudinal axis and fixed to the roof, and a tether extending from the first post to the third track.

9. The vehicle of claim 8, wherein the first airbag in the inflated position extends from the first post beyond the third track along a cross-vehicle axis.

10. The vehicle of claim 8, further comprising a second post supported by and movable along the third track, the tether extending from the first post to the second post.

11. The vehicle of claim 10, wherein the tether is fixed to the first airbag and extends from the first post around the second post to the first airbag when the first airbag is in the uninflated position.

12. The vehicle of claim 11, wherein the tether extends from the first post beyond the second post when the first airbag is in the inflated position.

13. The vehicle of claim 12, wherein the first airbag in the inflated position extends to a distal end and the tether is fixed to the distal end.

14. The vehicle of claim 8, further comprising a tether retractor fixed to the first post and operatively engaged with the tether.

15. The vehicle of claim 14, wherein the tether retractor includes pyrotechnic material.

16. The vehicle of claim 1, further comprising a covering surrounding the first post and the first airbag in the uninflated position.

17. The vehicle of claim 1, wherein the first airbag in the inflated position includes a main portion having an impact panel that extends along a cross-vehicle axis and an extension portion that extends rearward from the impact panel.

18. The vehicle of claim 17, further comprising a tether fixed to the extension portion and the first post.

* * * * *